(12) United States Patent
Bano

(10) Patent No.: US 11,369,970 B2
(45) Date of Patent: Jun. 28, 2022

(54) CRUSHER

(71) Applicant: Claudio Bano, Campodarsego (IT)

(72) Inventor: Claudio Bano, Campodarsego (IT)

( * ) Notice: Subject to any disclaimer, the term of this patent is extended or adjusted under 35 U.S.C. 154(b) by 95 days.

(21) Appl. No.: 16/803,445

(22) Filed: Feb. 27, 2020

(65) Prior Publication Data
US 2020/0269253 A1 Aug. 27, 2020

(51) Int. Cl.
*B02C 13/16* (2006.01)
*B02C 7/08* (2006.01)
*B02C 13/28* (2006.01)
*B02C 13/282* (2006.01)
*B02C 13/288* (2006.01)
*B02C 13/14* (2006.01)

(52) U.S. Cl.
CPC .............. *B02C 13/16* (2013.01); *B02C 7/08* (2013.01); *B02C 13/28* (2013.01); *B02C 13/282* (2013.01); *B02C 13/288* (2013.01); *B02C 2013/145* (2013.01); *B02C 2013/2808* (2013.01)

(58) Field of Classification Search
CPC ......... B02C 13/28; B02C 13/16; B02C 13/08; B02C 13/282; B02C 2013/2808
See application file for complete search history.

(56) References Cited

U.S. PATENT DOCUMENTS

| | | | | |
|---|---|---|---|---|
| 2,440,285 A | * | 4/1948 | Lykken | B02C 13/14 241/56 |
| 2,963,230 A | | 12/1960 | Lykken et al. | |
| 3,210,015 A | * | 10/1965 | Tollemache | B02C 13/14 241/56 |
| 3,993,256 A | * | 11/1976 | Brewer | B02C 13/16 241/186.5 |
| 4,002,301 A | * | 1/1977 | Shurtleff | B02C 13/288 241/48 |
| 4,151,794 A | * | 5/1979 | Burkett | B02C 13/286 100/215 |
| 4,202,078 A | * | 5/1980 | Malinak | D01B 1/14 19/26 |
| 4,240,590 A | * | 12/1980 | Lautenschlager | B02C 13/08 241/188.1 |
| 4,369,548 A | * | 1/1983 | Malinak | B02C 13/16 19/26 |
| 4,720,051 A | * | 1/1988 | Graveman | B02C 13/288 241/186.3 |
| 5,067,661 A | * | 11/1991 | Eide | B02C 13/18 241/55 |
| 5,192,029 A | * | 3/1993 | Harris | B02C 13/14 241/154 |
| 5,205,500 A | * | 4/1993 | Eide | B02C 13/18 241/154 |

(Continued)

FOREIGN PATENT DOCUMENTS

CN 104525313 A 4/2015

*Primary Examiner* — Faye Francis
(74) *Attorney, Agent, or Firm* — Cantor Colburn LLP

(57) ABSTRACT

A crusher having a substantially tubular casing, closed in an upper region by a cover and in a lower region by a base. The crusher also includes a rotating shaft, which is internal and coaxial to the casing, with multiple supporting elements, each element for supporting a number of crushing elements, being keyed to the shaft. The crushing elements have circular trajectories with a circumference that at least partially increases from the upper region toward the lower region of the crusher.

19 Claims, 7 Drawing Sheets

(56) References Cited

U.S. PATENT DOCUMENTS

| | | | | |
|---|---|---|---|---|
| 5,685,500 | A * | 11/1997 | Eide | B02C 13/18 |
| | | | | 241/154 |
| 6,179,231 | B1 * | 1/2001 | Csendes | B02C 13/18 |
| | | | | 241/19 |
| 6,227,473 | B1 * | 5/2001 | Arnold | B02C 13/18 |
| | | | | 241/285.1 |
| 6,325,306 | B1 * | 12/2001 | Gacanich | B02C 13/18 |
| | | | | 241/15 |
| 8,267,337 | B2 * | 9/2012 | Webb | B02C 23/14 |
| | | | | 241/27 |
| 8,662,429 | B2 * | 3/2014 | Matlin | B02C 18/0007 |
| | | | | 241/69 |
| 8,678,306 | B2 * | 3/2014 | Watts | B02C 13/1814 |
| | | | | 241/55 |
| 9,751,087 | B2 * | 9/2017 | Watts | B02C 13/14 |
| 2009/0159732 | A1 | 6/2009 | Zollig | |
| 2009/0194624 | A1 * | 8/2009 | Knueven | B02C 13/185 |
| | | | | 241/275 |
| 2016/0144371 | A1 | 5/2016 | Sontag | |
| 2016/0228879 | A1 * | 8/2016 | Scharfe | B02C 13/282 |
| 2018/0214882 | A1 | 8/2018 | Watts | |

* cited by examiner

CRUSHER

CROSS REFERENCE TO RELATED APPLICATIONS

This application is related to and claims the benefit of Italian Patent Application No. 102019000002795, filed on Feb. 27, 2019, the contents of which are hereby incorporated by reference in their entirety.

TECHNICAL FIELD

The present disclosure relates to a crusher. The disclosure is applicable in the industrial field in the sector of recycling and in particular in the recycling of large articles or articles requiring several steps in order to obtain elements suitable for recycling, such as for example electrical household appliances, compressors, electric motors, alternators, transformers.

BACKGROUND

Currently, in order to recover the materials of large articles, these articles are normally first partially disassembled manually or subjected to primary crushing, in order to obtain scrap.

This scrap is then subjected to milling in one or more crushers, having a vertical or horizontal axis, in order to obtain small fragments, even on the order of a few millimeters.

These crushers generally comprise a rotating shaft, which is arranged internally and coaxially with respect to an external tubular casing, which is closed at one end by a cover with an inlet for the scrap and, at the other end, by an apparatus for recovering the generated fragments.

Discs for supporting crushing elements, such as hammers or elements with a star-shaped profile, are keyed on the rotating shaft. These discs all have the same dimensions and are normally arranged at a constant mutual distance. The outside diameter of these discs is comparable with the inside diameter of the casing.

After crushing, the metallic fragments are separated from the fragments made of plastic material, for example by using magnetic means or by means of specific gravity selectors.

These conventional methods have some drawbacks.

Recovery of the materials according to what has been described above causes a long process, the need to perform a primary operation to obtain scrap, which is not always easy, and then at least one or more crushing operations.

Furthermore, considering crushers with a vertical axis, in order to be able to obtain fragments of the chosen dimensions a grille is usually placed on the bottom of the crusher and is adapted to allow only the fragments that are cut to size to pass and to retain the outsize ones, which are then subjected to crushing again. Moreover, the presence of the grille can cause the accumulation of toxic and/or incendiary and/or explosive dust and/or fumes.

Moreover, the crushers with vertical axis that are used are awkward to inspect, maintain and clean: in order to be able to access the discs and the hammers it is in fact necessary to remove the shaft from above, removing the cover and using bulky bridge crane systems. In order to remove the cover it is necessary to remove the fastening elements, such as for example bolts. In order to be able to remove the shaft it is furthermore necessary to remove it from its base.

SUMMARY

The aim of the present disclosure is to provide a crusher that is capable of improving the background art in one or more of the aspects indicated above.

Within this aim, the disclosure provides a crusher that allows to crush even large articles without the need for preliminary operations.

The disclosure provides a crusher that does not have or require a screening grille in order to obtain fragments of the desired size.

The disclosure further provides a crusher that is easier, simpler and faster to inspect, clean and maintain with respect to crushers of the known type.

The disclosure also provides a crusher in which there is no risk of accumulation of toxic and/or incendiary and/or explosive dust and/or fumes.

The disclosure further provides a crusher that is highly reliable, relatively easy to provide and at competitive costs.

This aim, as well as these and other advantages which will become better apparent hereinafter, are achieved by providing a crusher of the type with a vertical axis, comprising:
  a substantially tubular casing, closed in an upper region by a cover and in a downward region by a base,
  a rotating shaft, which is internal and coaxial to said casing, multiple supporting elements, each for supporting a plurality of crushing elements, being keyed to said shaft,
said crusher being characterized in that said crushing elements have circular trajectories with a circumference that at least partially increases from the upper region toward the lower region of the crusher.

BRIEF DESCRIPTION OF THE DRAWINGS

Further characteristics and advantages of the disclosure will become better apparent from the description of a preferred but not exclusive embodiment of the crusher according to the disclosure, illustrated by way of non-limiting example in the accompanying drawings, wherein.

DETAILED DESCRIPTION OF THE DRAWINGS

Figure 1A:
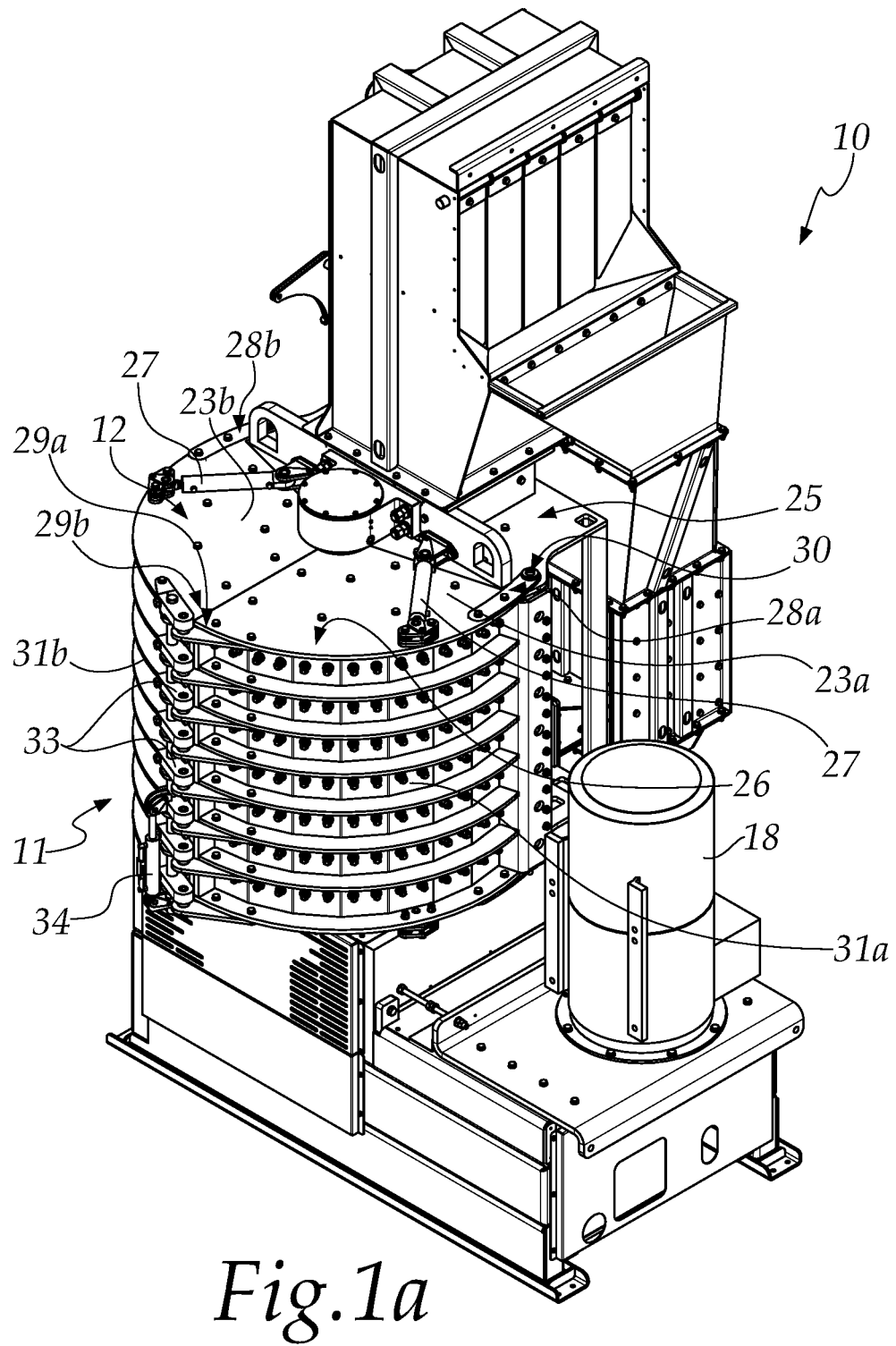
FIGS. 1a and 1b are two different general perspective views of a crusher according to the disclosure.
Figure 1B:
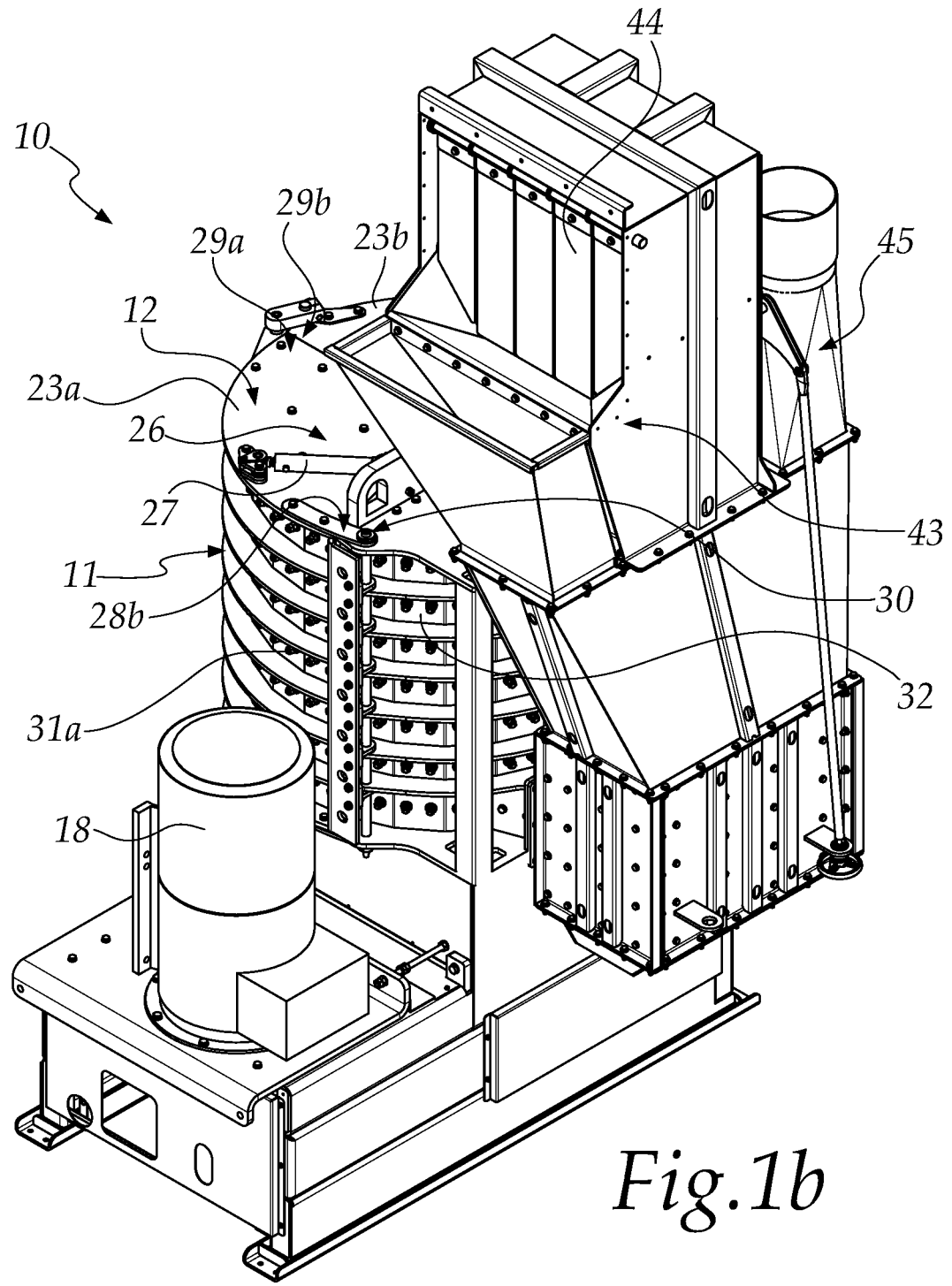
Figure 2:
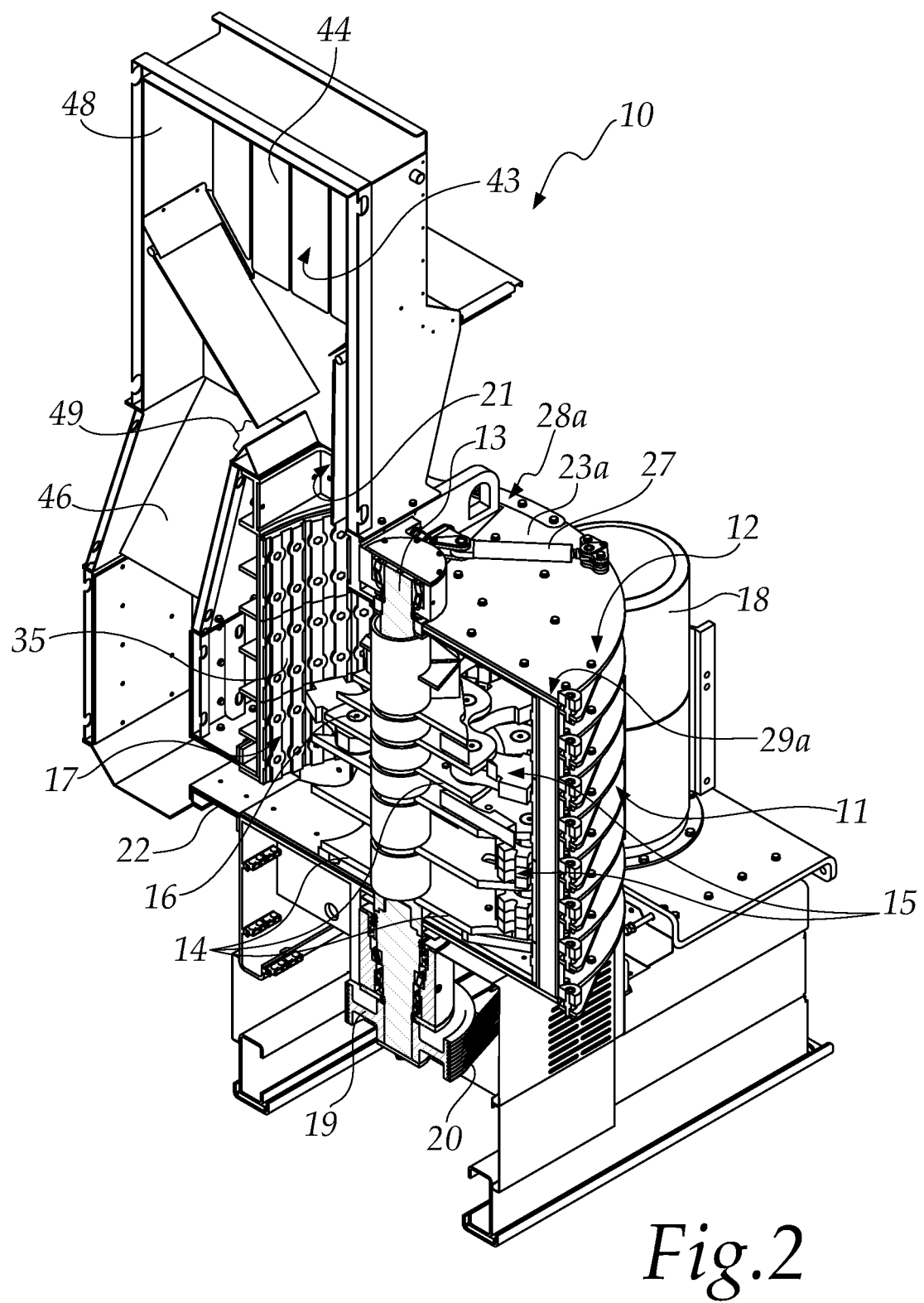
FIG. 2 is a sectional view of the crusher of FIGS. 1a and 1b.
Figure 3:
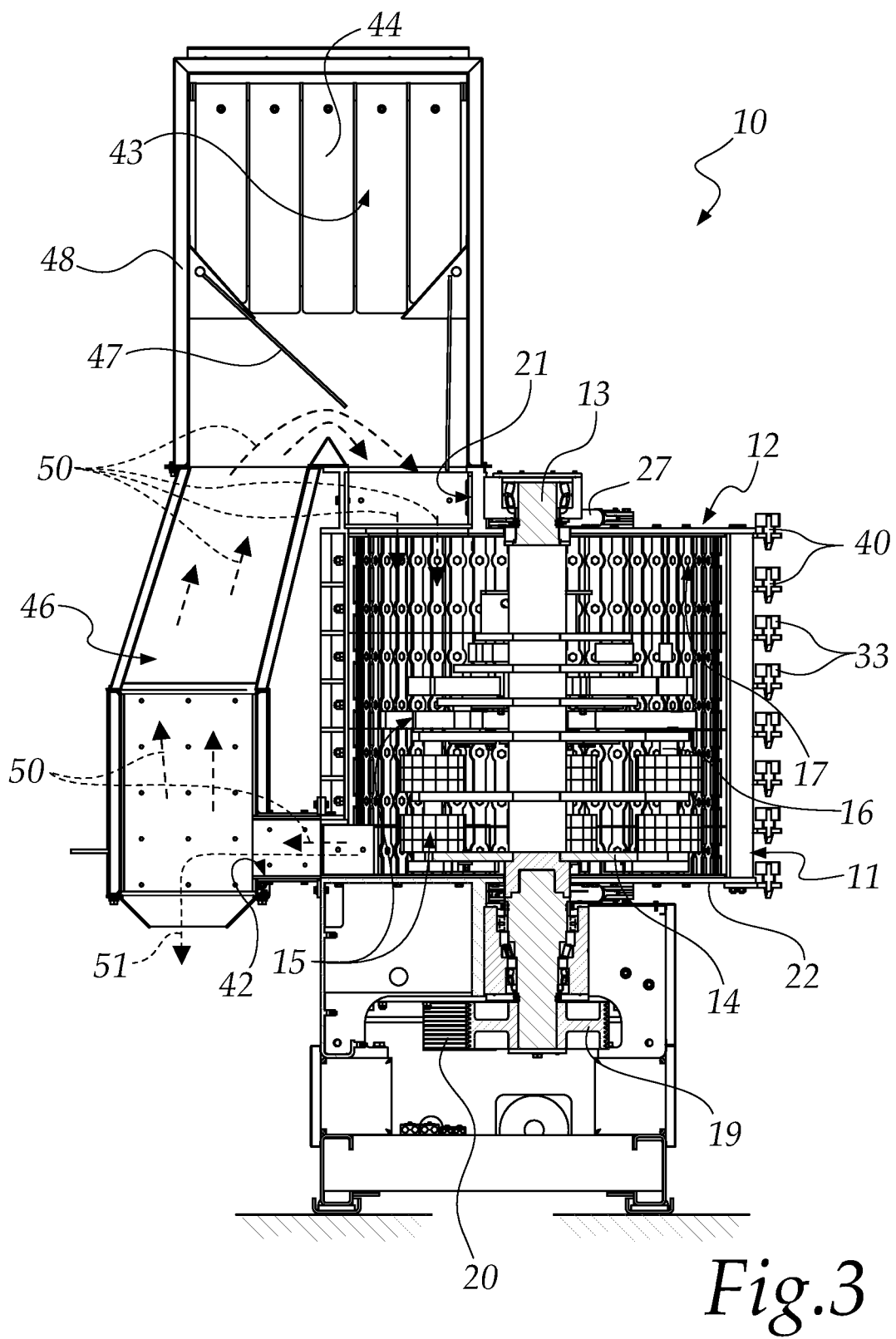
FIG. 3 is a different sectional view of the crusher of FIGS. 1a and 1b.

With reference to FIGS. 1-8b, a crusher according to the disclosure is designated generally by the reference numeral 10.

The crusher 10 has a vertical axis.

The crusher 10 comprises a casing 11 which is substantially tubular and is closed in an upper region by a cover 12, and in a lower region by a base 22.

The crusher 10 comprises, inside the external casing 11, a rotating shaft 13, which is coaxial to the external casing 11.

Multiple supporting elements 14 are keyed on the rotating shaft 13 and each supports a plurality of crushing elements 15.

Figure 8A:
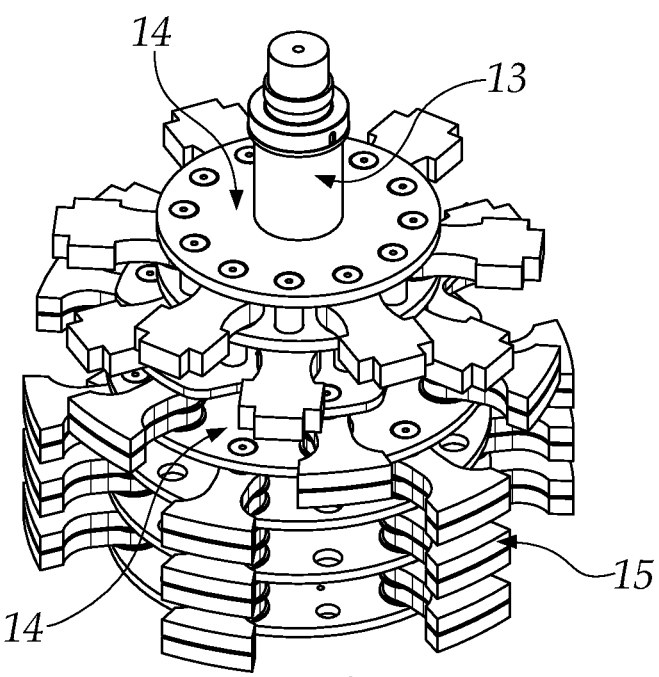
FIGS. 8a and 8b are views of two different embodiments of a part of the crusher of FIGS. 1a and 1b.
Figure 8B:
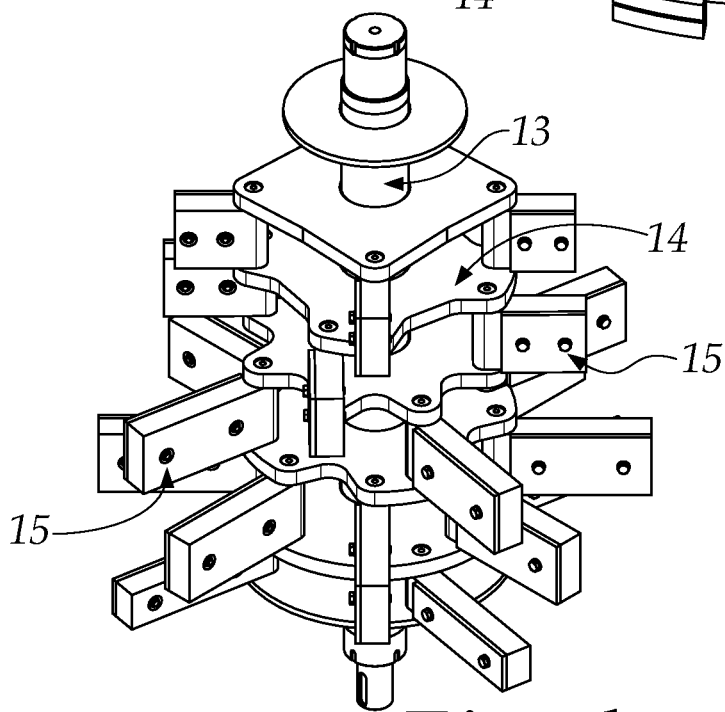

The supporting elements 14 are substantially but not necessarily disc-shaped and can have even different profiles within a same embodiment, such as for example the one shown in FIG. 8b.

Figure 6A:
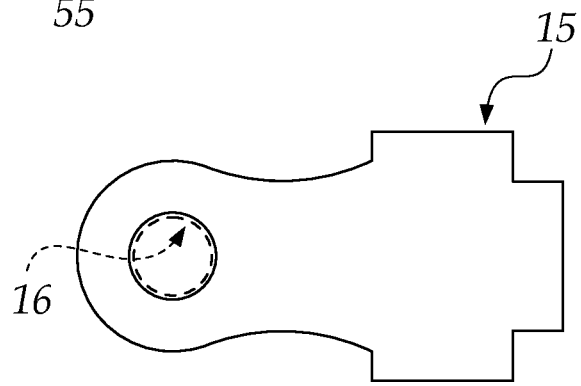
FIGS. 6a to 6c are views of three components of the crusher of FIGS. 1a and 1b.
Figure 6B:
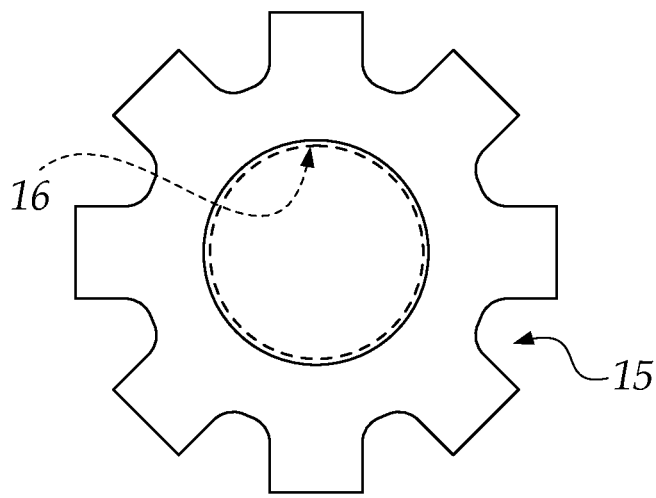
Figure 6C:
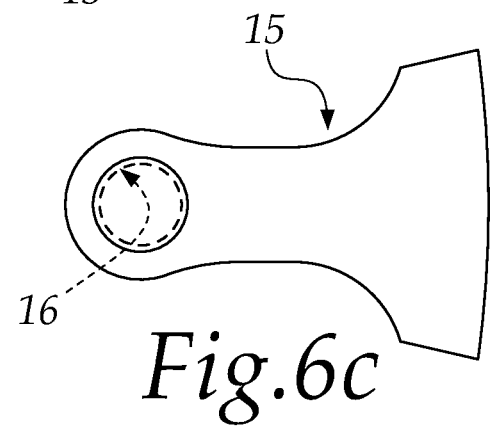
Figure 7:
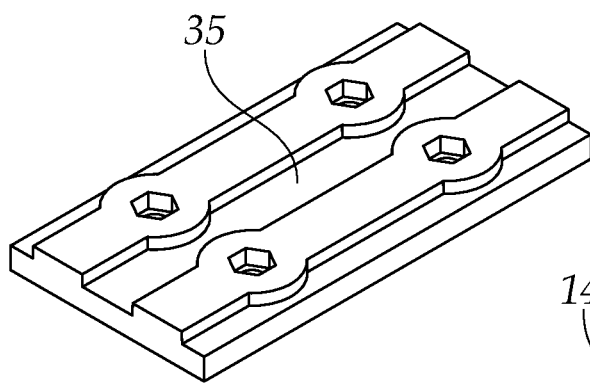
FIG. 7 is a view of a further component of the crusher of FIGS. 1a and 1b.

The crushing elements 15 are for example hammers, such as the ones shown in FIGS. 6a and 6c, and/or elements with a star-shaped profile, such as the one shown in FIG. 6b, and/or maces and/or paddles such as the ones shown m FIG. 8b.

One of the particularities of the crusher 10 resides in that the crushing elements 15 have circular paths with a circumference that at least partially increases from the upper region toward the lower region of the crusher 10.

The crushing elements 15 are coupled to at least one of the supporting elements 14 but can move with respect to it.

The crushing elements 15 are hinged to at least one of the supporting elements 14.

Figure 4:
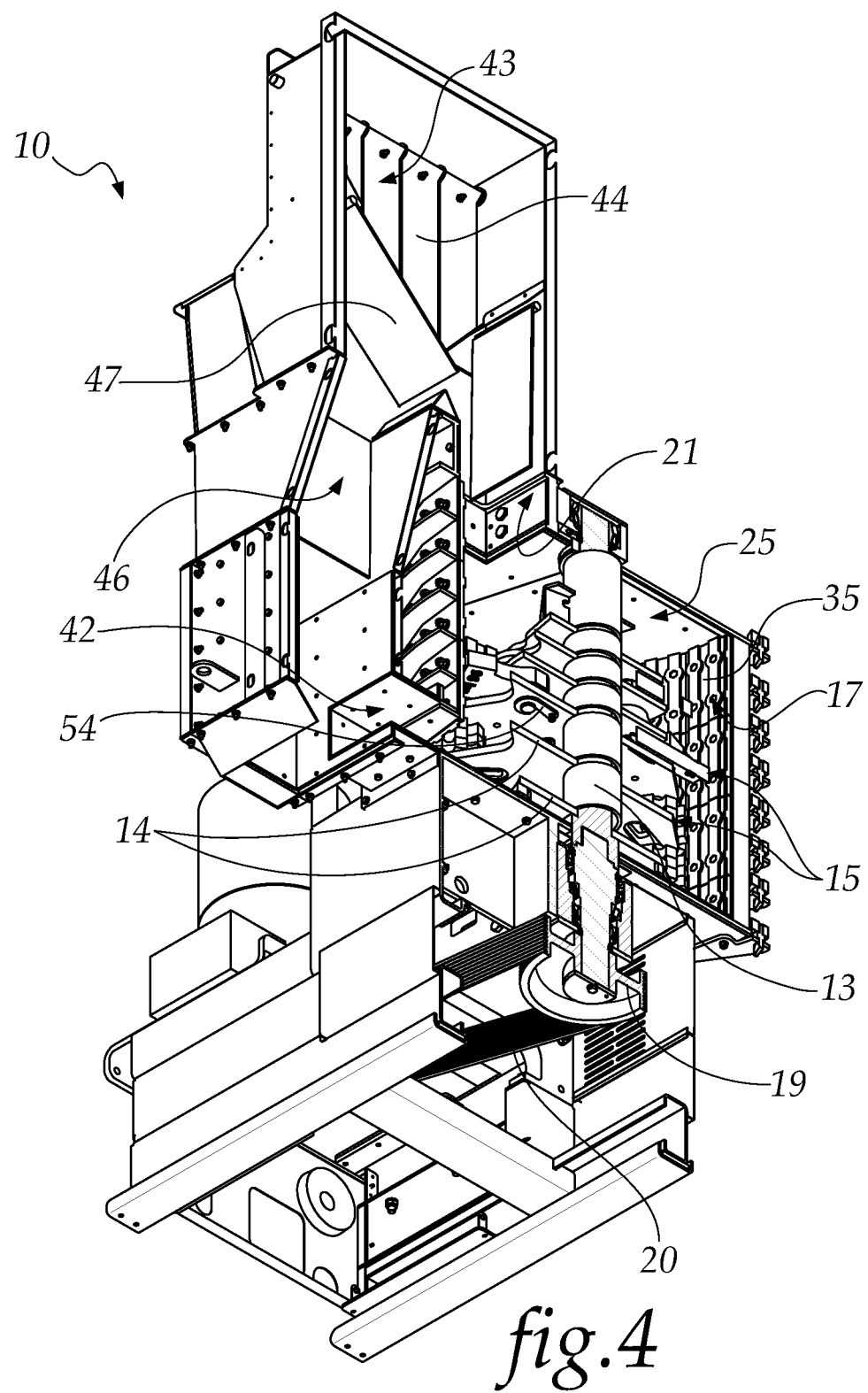
FIG. 4 is a different sectional perspective view of the crusher of FIGS. 1a and 1b.
Figure 5:
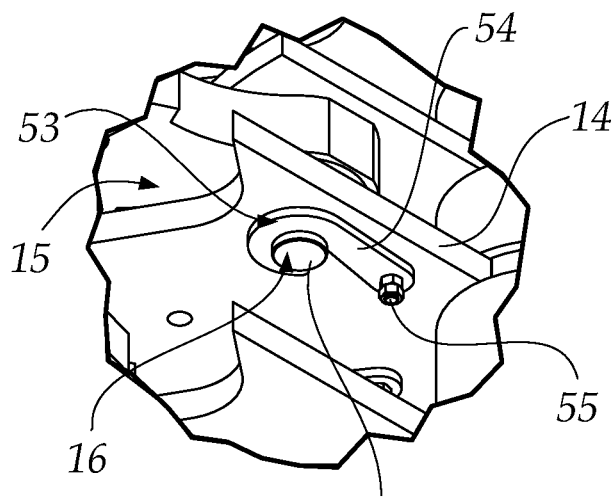
FIG. 5 is an enlarged-scale view of a detail of the view of FIG. 4.

With reference to FIGS. 4 and 5, the hinge element 16 has an end 52 that is contoured so as to define a receptacle for the arc-like portion 53 of a claw-shaped hook 54.

The hook 54 is connected to a supporting element 14 by means of a pivot 55 that is perpendicular thereto and can rotate about the axis of said pivot.

In this manner, in order to associate the crushing element 15 with the supporting element 14 it is sufficient to insert the hinge element 16, which in turn is associated with the crushing element 15, in an adapted through hole, not shown in the figures, that is present on the supporting element 14.

Once the end 52 of the hinge element 16 has passed through the hole, it is sufficient to simply turn the hook 54 in order to make its arc-like portion 53 enter the adapted receptacle of the end 52 of the hinge element 16.

It should be noted that no other connecting elements between the supporting element 14 and the crushing element 15 are necessary.

It should also be noted that with this solution the crushing elements 15 can be removed easily and rapidly from the crusher.

In particular, at least some of the crushing elements 15 are hinged, by virtue of hinge elements 16, to at least two parallel supporting elements 14.

The crusher 10 does not have a grille on the bottom of the casing 11; in this manner, the larger and coarser fragments are the first ones to be expelled from the crusher.

The casing 11 is provided with an internal surface 17 that is covered by a plurality of replaceable applied portions 35 made of a material that is resistant to abrasion, such as alloys based on manganese or the material known by the trade name Hardox.

FIGS. 8a and 8b show two different embodiments of the rotor of a crusher according to the disclosure.

The term "rotor", in the present description, refers to the part that rotates inside the casing 11, which comprises the rotating shaft 13, the supporting elements 14 and the crushing elements 15.

The shaft 13 is moved by motor means 18, with variable speed and direction of rotation, by means of a pulley 19 that is keyed thereon, and a belt 20 for transmission of motion between the motor means 18 and the pulley 19.

In a first fixed region 25 of the cover 12 there is an inlet 21, which is connected to an access portion 43 for the insertion of the articles to be crushed.

The access portion 43 is provided with a strip curtain 44 and is arranged above the inlet 21.

The inlet 21 has a rectangular profile and such dimensions as to allow the passage of articles such as large electrical household appliances in one piece.

In a second region 26, which is opposite the first region 25, the cover 12 is constituted by two portions 23a and 23b which can be opened individually.

In particular, each portion 23a and 23b is provided with an external surface substantially shaped like a quarter circle. Each portion 23a, 23b, symmetrically with respect to the other, is coupled to the fixed region 25 by means of a hinge 30.

The hinge 30 is arranged proximate to one end 28a, 28b of the circular arc defined by the same portion 23a, 23b of the cover 12.

The ends 29a, 29b of these two circular arcs that are opposite the hinged ones 28a, 28b, respectively of the portion 23a and of the portion 23b, are adjacent.

Each portion 23a, 23b of the cover 12 is connected to motor means 27, such as for example a hydraulic linear actuator coupled to the first fixed region 25, adapted to rotate the portion 23a, 23b about its own hinge 30.

In this manner it is possible to move just a single portion 23a or 23b for the inspection, maintenance and cleaning operations, without having to remove the entire cover 12.

Below each portion 23a, 23b of the cover 12 there is a corresponding curved portion 31a, 31b of the casing 11, which is coupled thereto and is hinged to a fixed portion 32 of the casing 11, on the same axis as the hinge 30 of the portion 23a, 23b.

The portions 31a and 31b of the casing 11 are adjacent and symmetrical with respect to the vertical plane of symmetry of the casing 11.

In this manner it is possible to move easily just one of the two curved portions 31a or 31b together with the corresponding portion 23a or 23b of the cover 12 for the inspection, maintenance and cleaning operations.

Furthermore, by moving both curved portions 31a, 31b it is possible to open the casing 11 and to freely access the shaft 13 and the crushing elements 15 without moving said shaft.

The adjacent edges of the curved portions 31a and 31b of the casing 11 are mutually fixed by means of a plurality of removable couplings such as for example a plurality of pins 40 fixed to a portion 31a, and a plurality of corresponding eyes 33 which translate in a concordant and synchronized manner and are connected to the other portion 31b. The eyes 33 are all connected to a same bar moved by an automatic hydraulic actuator 34.

The pins are adapted to enter the eyes 33 in a configuration for closing the casing 11.

In this manner it is possible to lock the two curved portions 31a and 31b rapidly or release them when it is necessary to move one of them for the cleaning operations.

Once the crusher 10 has been opened, it is possible to extract the shaft 13 from the casing 11 simply by removing some screws that fix it to the cover 12.

Proximate to the base 22 of the casing 11 there is a system for recovering the generated fragments, of a per se known type, not shown in the figures.

The crusher 10 also comprises an extraction apparatus 45, shown partially in the figures, adapted to retain any toxic and/or incendiary and/or explosive dust and/or fumes above certain concentrations but not to extract metal dust to be recycled.

In particular, the extraction apparatus is connected to the output portion 42 and extracts a stream of air at low speed, on the order of 25 m/s.

During operation, the crusher 10 generates a considerable flow of air from the inlet 21 to the output portion 42 due to the rotation of the crushing elements 15.

By virtue of the contribution of the above-cited extraction apparatus 45 and of the absence of the grille at the base 22, this considerable flow of air allows to avoid high concentrations of dust which, in some kinds, can become explosive above certain concentrations.

In particular, between the output portion 42 and the access portion 43 there is a duct for connection between the two portions.

Proximate to the strip curtain 44, above the duct 46 and at its upper end, there is an air flow deflector 47 adapted to produce a recirculation of the air inside the crusher 10 along the direction indicated by the arrows 50.

In particular, the deflector 47 is inclined with respect to the direction of extension of the duct 46 and extends from a side wall 48 of the access portion 43 substantially up to the inlet 21, allowing a passage 49 between the duct 46 and the inlet 21.

In a preferred but not exclusive embodiment, the supporting elements 14 and the corresponding crushing elements 15 define, from the upper region downward, substantially three processing stages:
- a first breakup stage, which has crushing elements 15 constituted by hammers of various shapes and weights, in which the introduced article is broken up,
- a second disaggregation stage, provided with crushing elements 15 constituted by hammers and elements with a star-shaped profile of various shapes and weight, in which the broken pieces are reduced to shreds,
- a third compaction stage, provided with crushing elements 15 constituted by hammers and maces of various shapes and weight, in which the shreds are compacted.

The third compaction stage allows to agglomerate and compact metallic shreds and, for an equal volume, to obtain products having a larger mass.

This is particularly advantageous for the production of foundry scrap. For an equal mass to be obtained, it is sufficient to load the crucible fewer times by virtue of the compaction of the shreds.

The operation of the crusher 10 according to the disclosure is as follows.

The article to be crushed, for example an electric motor, is introduced in the casing 11 from the inlet 21.

The article is in one piece and has not undergone preliminary scrapping operations.

Due to gravity, the article moves downward and passes through the various stages cited above. Due to the variation of the circumference of the circular trajectory of the crushing elements 15, which increases at least partially from the upper region downward, as the fragments descend, the space between the individual crushing element 15 and the internal surface 17 of the casing 11 decreases.

Accordingly, the individual fragment, due to:
- the trend of the circumference of the circular trajectory of the crushing elements 15,
- the action of the crushing elements 15,
is progressively reduced in volume in passing from upper crushing elements 15 to lower crushing elements 15.

When the fragments reach the base 22 of the casing 11, they already have a volume cut to size and therefore it is not necessary to mill again the outsize ones, as occurs in crushers of the known type. In this manner, a filtering grille is no longer necessary.

The coarser and more massive metallic fragments are instead the first to be expelled, due to their mass and due to the absence of the grille. During passage through the various stages, however, the coarser and more massive metallic parts are stripped of any coatings, for example sheaths of plastic material.

Due to the motion of the crushing elements 15, the crushed products are expelled automatically from the output portion 42 along the direction of the arrow 51.

It should be noted that with the disclosure it is not necessary to subject the article to be crushed to preliminary scrapping operations.

In practice it has been found that the disclosure achieves the intended aim and advantages, providing a crusher that allows to crush even large articles without the need for preliminary operations.

Furthermore, the disclosure provides a crusher that does not require a screening grille to obtain fragments of the chosen size.

Moreover, the disclosure provides a crusher that is easier, more convenient and quicker to inspect, clean and maintain with respect to crushers of the known type.

Finally, the disclosure provides a crusher in which there is no risk of accumulation of toxic and/or incendiary and/or explosive dust and/or fumes.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102019000002795 from which this application claims priority are incorporated herein by reference.

What is claimed is:
1. A crusher comprising:
   a tubular casing, closed in an upper region by a cover and in a lower region by a base,
   a rotating shaft, which is internal and coaxial to said casing, a plurality of supporting elements, each of said supporting elements configured to support a plurality of crushing elements, being keyed to said shaft,
   wherein said crushing elements have circular trajectories with a circumference that at least partially increases from an upper region toward a lower region of the crusher,
wherein the crusher further comprises three processing stages including:
   a first breakup stage, provided with said crushing elements constituted by hammers,
   a second disaggregation stage, provided with said crushing elements constituted by hammers and elements with a star-shape, and
   a third compaction stage, provided with said crushing elements constituted by hammers and maces.
2. The crusher according to claim 1, wherein said supporting elements are disc-shaped.
3. The crusher according to claim 1, wherein said crushing elements are hammers, elements with a star-shaped profile, maces, and/or paddles.

4. The crusher according to claim 1, wherein at least some of said crushing elements are pivoted by at least one hinge element to at least two of said supporting elements.

5. The crusher according to claim 4, wherein said at least one hinge element has an end shaped so as to form a receptacle of an arc portion of a hook, said hook being connected to one of said supporting elements by a pivot perpendicular thereto and configured to rotate about an axis of said pivot.

6. The crusher according to claim 1, wherein said cover has:
a first region having an inlet configured for introducing the articles to be crushed inside said crusher, and
a second region that is openable.

7. The crusher according to claim 6, wherein said second region is arranged opposite said first region and is constituted by two portions.

8. The crusher according to claim 7, wherein each one of said portions of said cover is connected to motor means adapted to make it rotate about its own hinge.

9. The crusher according to claim 7, wherein each one of said two portions has an external surface with a circular arc shape and is coupled to said first region by a hinge, symmetrically with respect to each other, said hinge being arranged proximate to an end of the circular arc defined by each one of said two portions of said cover.

10. The crusher according to claim 9, wherein two corresponding curved and openable portions of said casing are disposed below said two portions of said cover, each one of said corresponding curved and openable portions being coupled to a corresponding one of said two portions of said cover and being hinged to a fixed portion of said casing on a same axis as said hinge, each one of said curved and openable portions being adjacent and symmetrical with respect to a vertical plane of symmetry of said casing.

11. The crusher according to claim 10, wherein adjacent edges of said curved and openable portions of said casing are mutually fixed using a plurality of removable couplings.

12. The crusher according to claim 11, wherein said removable couplings are a plurality of pins fixed to one of said curved and openable portions and a plurality of corresponding eyes that translate in a concordant and synchronized manner, connected to another one of said curved portions, said eyes all being connected to a same bar moved by an actuator, said pins being adapted to be inserted in said eyes.

13. The crusher according to claim 9, wherein said two portions have adjacent ends of said circular arc, said adjacent ends being each opposite said end coupled to said hinge.

14. The crusher according to claim 1, comprising motor means, a transmission belt and a pulley being keyed on said rotating shaft for the movement of said rotating shaft.

15. The crusher according to claim 1, comprising a system for recovering the produced fragments disposed proximate to said base.

16. The crusher according to claim 1, comprising an internal surface covered by a plurality of replaceable applied portions of abrasion-resistant material.

17. The crusher according to claim 1, comprising an extraction apparatus, which is adapted to retain any toxic, incendiary, explosive dust, and/or fumes above certain concentrations but not to extract metal dust to be recycled, said apparatus being connected to an output portion of said crusher.

18. The crusher according to claim 17, having a connecting duct disposed between said output portion and an access portion connected to said inlet.

19. The crusher according to claim 18, further comprising above said duct and at an upper end thereof, a deflector inclined with respect to an extension direction of said duct, extending from a side wall of said access portion up to said inlet, allowing a passage between said duct and said inlet.

* * * * *